(12) United States Patent
Kawahata (10) Patent No.: US 6,507,375 B1
(45) Date of Patent: Jan. 14, 2003

(54) LIQUID CRYSTAL DISPLAY DEVICE IN WHICH NEIGHBORING PIXEL ELECTRODES OVERLAP SOURCE LINE BY DIFFERENT WIDTHS

(75) Inventor: Ken Kawahata, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 146 days.

(21) Appl. No.: 09/602,111

(22) Filed: Jun. 23, 2000

(30) Foreign Application Priority Data

Jun. 23, 1999 (JP) .......................................... 11-177533

(51) Int. Cl.$^7$ ............................................ G02F 1/1343
(52) U.S. Cl. ......................... 349/38; 349/139; 349/143
(58) Field of Search .................................. 349/143, 139, 349/38, 39

(56) References Cited

U.S. PATENT DOCUMENTS

| | | | |
|---|---|---|---|
| 5,132,819 A | | 7/1992 | Noriyama et al. |
| 5,459,596 A | * | 10/1995 | Ueda et al. ..................... 359/59 |
| 5,781,260 A | * | 7/1998 | Miyazawa ................... 349/111 |
| 5,953,088 A | * | 9/1999 | Hanazawa et al. ........... 349/110 |
| 6,147,722 A | * | 11/2000 | Shimada et al. ............... 349/43 |
| 6,300,987 B1 | * | 10/2001 | Jung ............................ 349/39 |

* cited by examiner

Primary Examiner—Toan Ton
Assistant Examiner—Andrew Schechter
(74) Attorney, Agent, or Firm—Brinks Hofer Gilson & Lione (57) ABSTRACT

A liquid crystal display device includes an insulating layer disposed between the source lines and the transparent electrodes on one substrate. Transparent pixel electrodes adjacent to both sides of one of the source lines overlap the source line with different overlapping widths and an auxiliary capacitor is formed to cancel the difference in the amount of parasitic capacitance generated due to the overlap of the individual transparent pixel electrodes with the source line.

23 Claims, 7 Drawing Sheets

LIQUID CRYSTAL DISPLAY DEVICE IN WHICH NEIGHBORING PIXEL ELECTRODES OVERLAP SOURCE LINE BY DIFFERENT WIDTHS

BACKGROUND OF THE INVENTION

1. Field of the Invention

The present invention relates to the circuit configuration and layout of a pixel region in a liquid crystal display device provided with switching elements.

2. Description of the Related Art

In a conventional active matrix liquid crystal display device, a liquid crystal is enclosed between alignment layers provided on the individual inner surfaces of a pair of substrates, and a plurality of gate lines, a plurality of source lines, and thin-film transistors are formed on the opposing surface of one of the substrates. In order to increase the aperture ratio of an active matrix liquid crystal display device, a structure for suppressing disclination of the liquid crystal is conventionally used, in which sections that produce an electric field unnecessary to the liquid crystal, such as gate lines and source lines, are covered with transparent pixel electrodes.

The disclination is a phenomenon in which the alignment of a TN liquid crystal, which is a helical elastic body, is disordered in the presence of an electric field depending on the field intensity, the field direction, the helical direction, and the elastic constant. The disclination causes light leakage, and so on, resulting in a decrease in contrast ratio and degradation in display quality, such as residual images.

Figure 8:
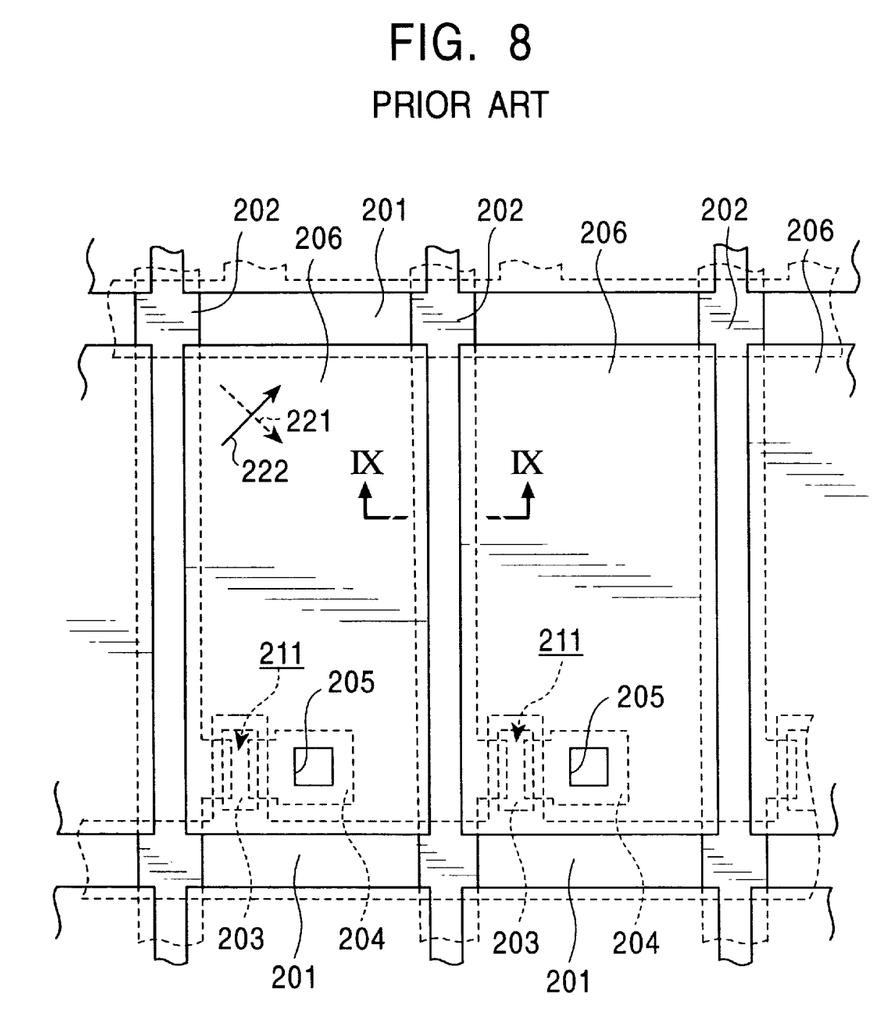
FIG. 8 is a plan view of a conventional liquid crystal device.
Figure 9:
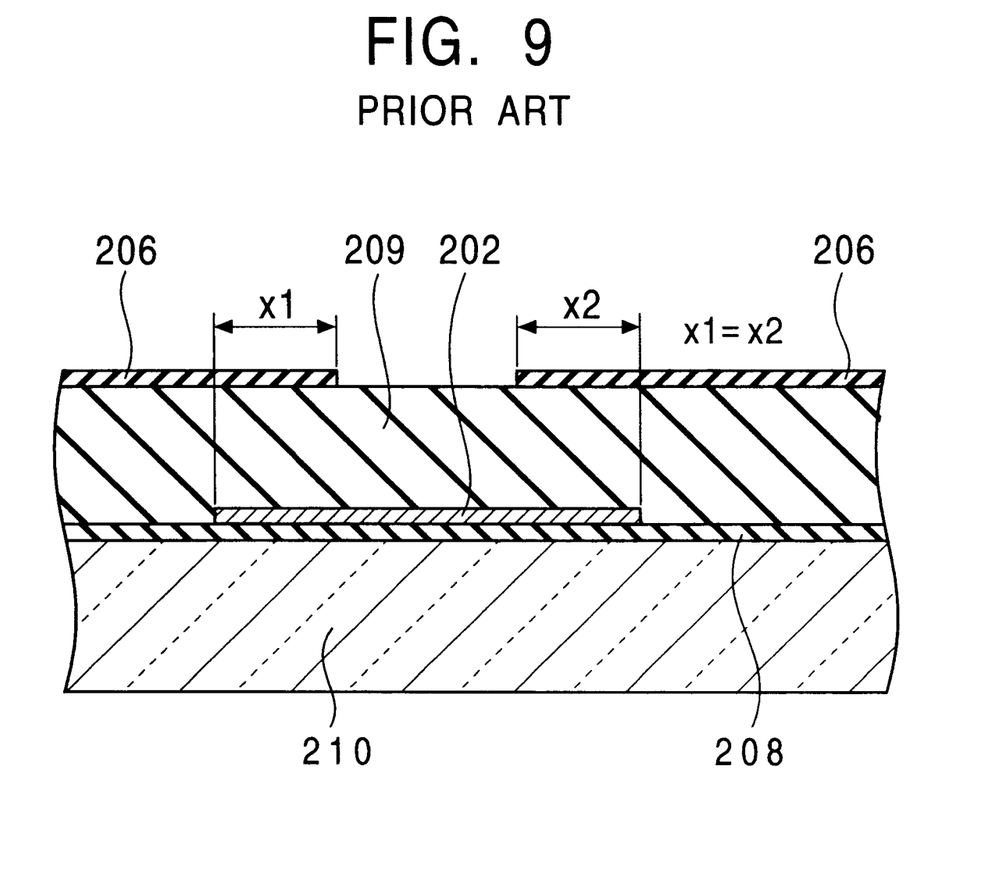
FIG. 9 is a sectional view taken along the line IX—IX of FIG. 8.

FIG. 8 is a plan view of a pixel region of a conventional active matrix liquid crystal device in which the aperture ratio is increased, and FIG. 9 is a sectional view taken along the line IX—IX of FIG. 8.

In the active matrix liquid crystal device, a plurality of gate lines 201 are arrayed in parallel on a glass substrate 210 and a plurality of source lines 202 are arrayed so as to be orthogonal to the gate lines 201 with a first insulating layer 208 therebetween. In the vicinity of each of the intersections of the gate lines 201 and the source lines 202, a thin-film transistor 211 composed of a semiconductor layer 203 composed of amorphous silicon or the like is disposed, and a drain electrode 204 thereof is connected to a transparent pixel electrode 206 through a contact hole 205 with a second insulating layer 209 therebetween.

In order to increase the aperture ratio, the transparent pixel electrode 206 is formed so as to overlap the gate lines 201 and the source lines 202, and thus the area of the transparent pixel electrode 206 is increased as much as possible, leakage of electric fields of the gate lines 201 and the source lines 202 is suppressed, and the occurrence of disclination is restricted within the gate line and source line regions. That is, the overlapping widths between the transparent pixel electrode 206 and the gate lines 201 and between the transparent pixel electrode 206 and the source lines 202 are designed so as to block the light leakage due to disclination.

In the structure described above in which the aperture ratio is increased, each overlapping portion of the transparent pixel electrode 206 with the gate line 201 or the source line 202 corresponds to parasitic capacitance. Although the dielectric constant of the second insulating layer 209 is decreased and the thickness of the second insulating layer 209 is increased, it has been known that the source lines 202 in which signals frequently vary are capacitively coupled to the transparent pixel electrode 206, resulting in crosstalk. In order to overcome this problem, the polarities of signals are reversed between the source lines 202 on both sides of the transparent pixel electrode 206, and thereby, the potential variation due to the capacitive coupling is offset. In order to obtain the offset effect, overlapping widths x1 and x2 of two adjacent transparent pixel electrodes 206 with the source line 202 are equalized.

Although disclination occurs at a different position depending on a liquid crystal molecular alignment direction, i.e., a rubbing direction 221 of a TFT substrate and a rubbing direction 222 of a counter substrate, in general, disclination occurs asymmetrically in two regions on either side of a source line. This is because of the fact that since an electric field curves like a bow above the source line, there is a deviation in disclination because the liquid crystal molecular alignment direction differs between a side in which the anchoring direction of liquid crystal molecules, which are anchored to the surface of the TFT substrate with a predetermined angle, and the electric field direction relatively agree with each other and a side in which they greatly differ. That is, in order to merely block the disclination, the aperture ratio can be further increased by setting the overlapping width x1 smaller than the overlapping width x2.

However, in the conventional structure, in view of offsetting the potential variation due to the capacitive coupling, the overlapping width x1 must be set equal to the overlapping width x2, and the overlapping width must be matched to the side in which the disclination is greater. The optically unused regions along the source lines, which are produced independent of the pixel size, cause a large decrease in the aperture ratio, in particular, in a high-resolution liquid crystal display device with a small pixel size.

SUMMARY OF THE INVENTION

Accordingly, it is an object of the present invention to provide a liquid crystal display device in which crosstalk is prevented from occurring and the aperture ratio is improved.

In accordance with the present invention, a liquid crystal display device includes a pair of substrates, a liquid crystal enclosed between alignment layers provided on the individual inner surfaces of the pair of substrates, a plurality of gate lines and a plurality of source lines intersecting each other arrayed in a matrix with a first insulating layer therebetween on the opposing surface of one of the substrates, switching elements, each connected to a gate electrode extending from one of the gate lines and to a source electrode extending from one of the source lines in the vicinity of each of the intersections between the gate lines and the source lines, and a transparent pixel electrode for driving the liquid crystal connected to each switching element through a drain electrode. A second insulating layer is disposed between the source lines and the transparent pixel electrodes, the transparent pixel electrodes adjacent to both sides of one of the source lines are formed so as to overlap the source line with different overlapping widths, and an auxiliary capacitor is formed to cancel a difference in the amount of parasitic capacitance generated due to the overlap of the individual transparent pixel electrodes with the source line.

The liquid crystal display device of the present invention is provided with the auxiliary capacitor for canceling the difference in parasitic capacitance generated due to the overlap of the transparent pixel electrodes with the source line with different overlapping widths in adjacent two pixel regions. That is, parasitic capacitance decreases in one of the adjacent pixel regions in which the overlapping width is smaller, and parasitic capacitance increases in the other pixel region in which the overlapping width is larger, and thus, by adding the auxiliary capacitance to the region having smaller parasitic capacitance, the adjacent pixel regions have the same sum of the parasitic capacitance and the auxiliary capacitance. Consequently, even if the overlapping width of the transparent pixel electrode with the source line differs between the adjacent pixel regions, the potential variation in the source line is satisfactorily offset, and crosstalk can be avoided. In other words, in the present invention, since crosstalk is prevented from occurring and the different overlapping widths of the transparent pixel electrodes with the source line are set, the transparent pixel electrodes and the source line are required to overlap merely by the widths for blocking the disclination occurring at the asymmetrical positions centering the source line, and the source line width can be decreased, resulting in an improvement in the aperture ratio.

Preferably, the auxiliary capacitor includes the source line as one electrode and an auxiliary electrode as the other electrode. The auxiliary electrode is disposed below the source line with the first insulating layer therebetween and is electrically connected to or capacitively coupled to the transparent pixel electrode or the drain electrode.

In such a case, the first insulating layer corresponds to a capacitor insulating layer constituting the auxiliary capacitor, and in general, the first insulating layer is very thin due to being the same layer as the gate insulating layer and has a large relative dielectric constant, and thereby large auxiliary capacitance can be obtained by a small overlapping area. Therefore, the aperture ratio can be further improved.

Preferably, the auxiliary capacitor includes an auxiliary electrode extending form the source line above the gate line as one electrode and the transparent pixel electrode extended thereon with the second insulating layer therebetween as the other electrode.

In such a configuration, it is not necessary to newly form an auxiliary electrode, and the pattern layout does not become complex, and thus the possibility of decreasing the yield is reduced.

DESCRIPTION OF THE PREFERRED EMBODIMENTS

Embodiments of a liquid crystal display device in the present invention will be described with reference to the drawings.

Figure 1:
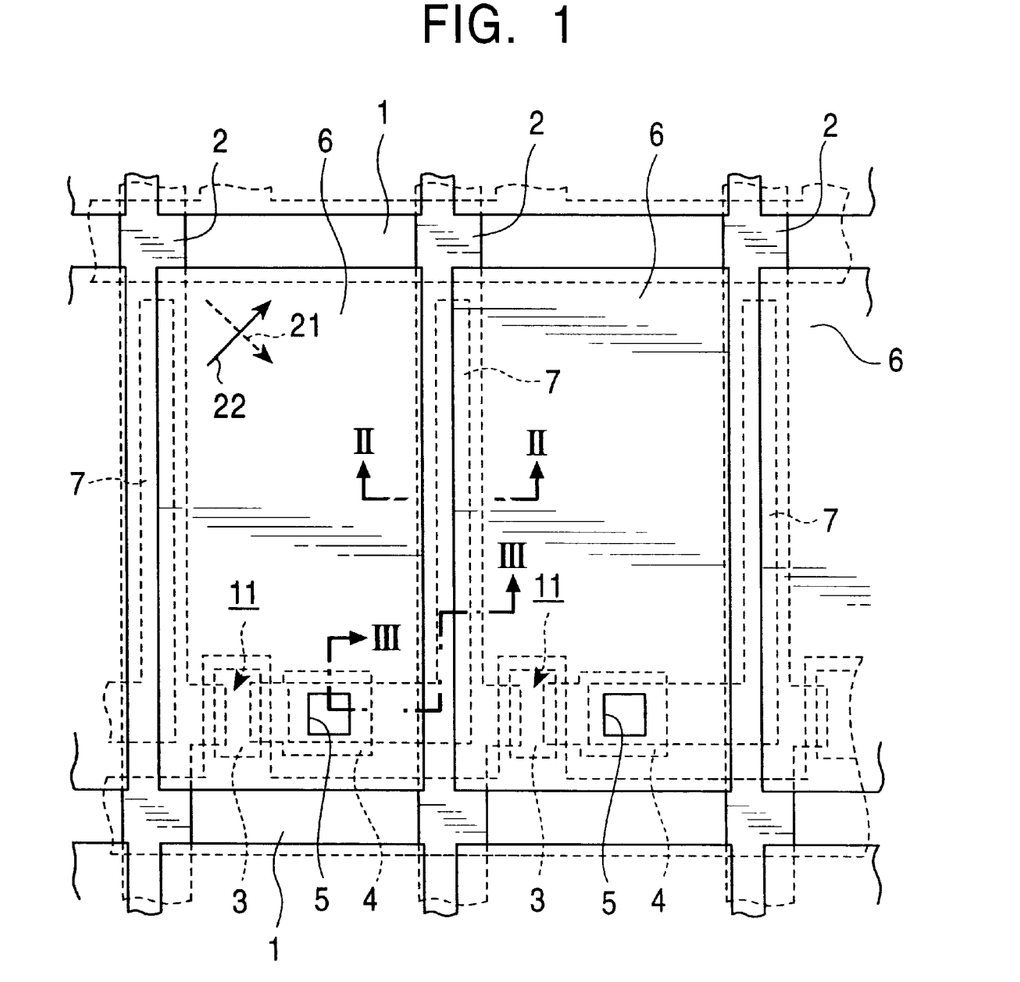
FIG. 1 is a plan view of a liquid crystal display device according to a first embodiment of the present invention.
Figure 2:
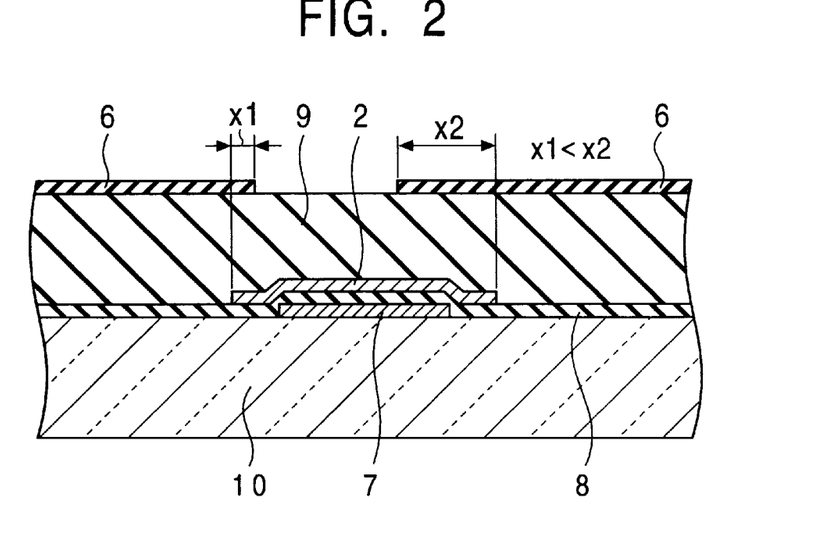
FIG. 2 is a sectional view taken along the line II—II of FIG. 1.
Figure 3:
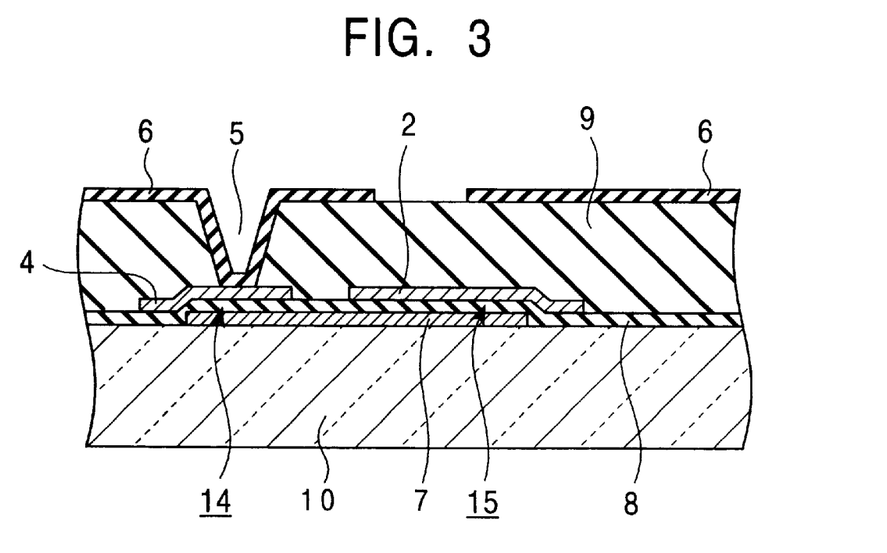
FIG. 3 is a sectional view taken along the line III—III of FIG. 1.
Figure 4:
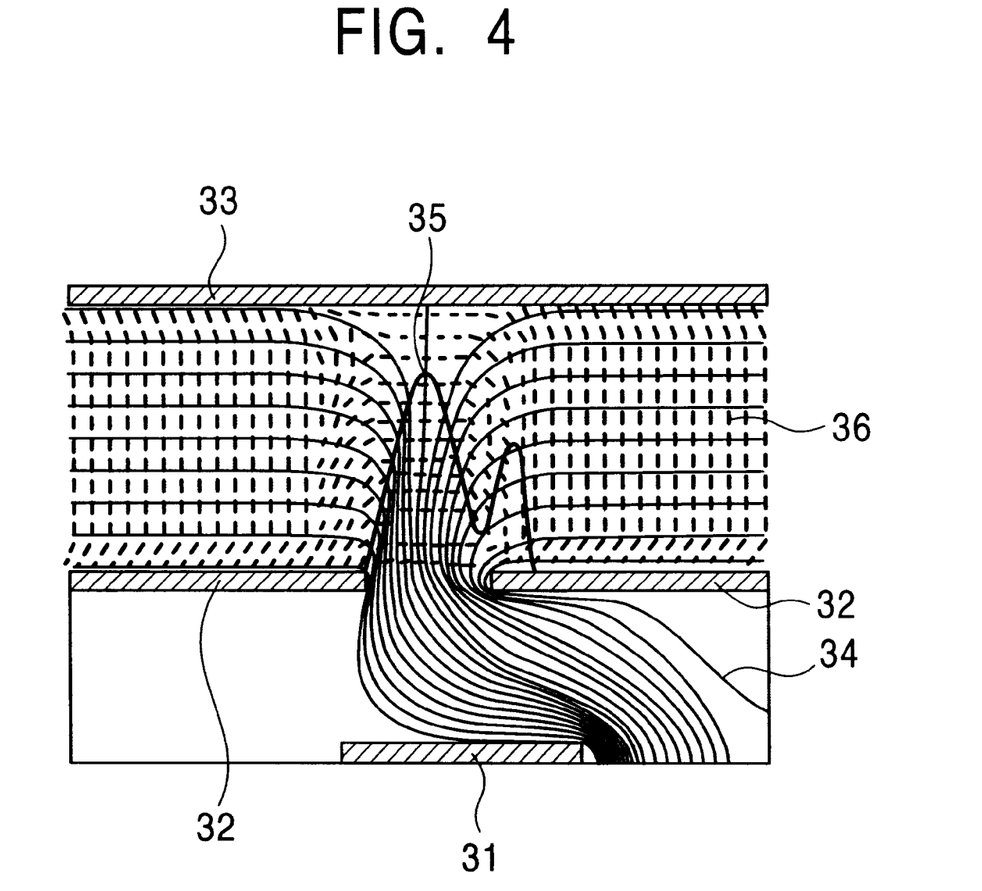
FIG. 4 is a diagram which shows the results of a simulation with respect to the electric field, the liquid crystal molecular alignment direction, and the transmittance when the liquid crystal display device of the first embodiment of the present invention is actually operated.

FIG. 1 is a plan view showing a pixel region in the first embodiment of the present invention, FIG. 2 is a sectional view taken along the line II—II of FIG. 1, FIG. 3 is a sectional view taken along the line III—III of FIG. 1, and FIG. 4 is a diagram which shows the results of a simulation in section along the line II—II with respect to the electric field, the liquid crystal molecular alignment direction, and the transmittance during actual operation. A plurality of gate lines 1 composed of a metallic thin film are arrayed in parallel on a glass substrate 10 and a plurality of source lines 2 composed of a metallic thin film are arrayed so as to be orthogonal to the gate lines 1 with a first insulating layer 8 therebetween. The first insulating layer 8 is the same layer as a gate insulating layer of a thin-film transistor 11, and is composed of $SiN_x$, $SiO_2$, or the like, with a thickness of 200 to 500 nm. In the vicinity of each of the intersections between the gate lines 1 and the source lines 2, the thin-film transistor 11 provided with a semiconductor layer 3 composed of amorphous silicon or the like is disposed, and a drain electrode 4 thereof is connected to a transparent pixel electrode 6 through a second insulating layer 9 via a contact hole 5. The second insulating layer 9 is composed of an organic material such as an acrylic resin with a thickness of approximately 1 to 3 $\mu$m. The transparent pixel electrodes 6 adjacent to both sides of one of the source lines 2 are formed so as to overlap the source line 2 with different overlapping widths. The overlapping widths are different at both sides of the source line with an overlapping width x1 being set at approximately 0.5 to 2 $\mu$m and with an overlapping width x2 being set at approximately 2.5 to 4 $\mu$m. The relationship in size between x1 and x2 depends on a liquid crystal molecular alignment direction, i.e., rubbing directions. In this embodiment, a rubbing direction of a TFT substrate is represented by an arrow 21 and a rubbing direction of a counter substrate is represented by an arrow 22 in the drawing. FIG. 4 shows the simulation results in such a case.

In FIG. 4, numeral 31 represents a source line, numeral 32 represents a transparent pixel electrode, and numeral 33 represents a counter electrode provided on a counter substrate (not shown in the drawing). The electric field, transmittance, and liquid crystal molecular alignment direction are schematically represented by numerals 34, 35, and 36, respectively. As is obvious from the simulation, when the rubbing directions used in this embodiment are employed, a peak in the transmittance occurs in the center between two adjacent pixel electrodes 32, and also another peak occurs on the right side thereof. Since the peak of the transmittance occurs in the pixel region on the right side of the center of the source line 31, i.e., an abnormal increase in the transmittance due to disclination occurs, the overlapping width of a transparent pixel electrode with a source line in the right-side region must be set larger than that of another transparent pixel electrode with the source line in the left-side region as shown in FIG. 1.

An auxiliary electrode 7 simultaneously formed with the gate line 1 is disposed below the source line 2 with the first insulating layer 8 therebetween to form a first auxiliary capacitor 15. By further extending the auxiliary electrode 7 to a section beneath the drain electrode 4, a second auxiliary capacitor 14 is formed. The first auxiliary capacitor 15 and the second auxiliary capacitor 14 are connected in series between the transparent pixel electrode 6 and the source line 2, and together function as an auxiliary capacitor. The size of the auxiliary electrode 7 is set so as to compensate for an imbalance of parasitic capacitance due to the different overlapping widths of the source line 2 with the transparent pixel electrodes 6 between the left-hand side and the right-hand side of the source line 2. In general, since the first auxiliary capacitor 15 between the source line 2 and the auxiliary electrode 7 can be formed larger than the second auxiliary capacitor 14 between the auxiliary electrode 7 and the drain electrode 4, the second auxiliary capacitance is designed so as to be equal to a difference in the capacitance between the overlapping widths of the transparent pixel electrodes 6 with the source line 2 on both sides.

The auxiliary electrode 7 may be electrically connected to one of the source line 2 and the drain line 4. In such a case, the size of the auxiliary electrode 7 must also be set so as to compensate for an imbalance of parasitic capacitance due to the different overlapping widths of the source line 2 with the transparent pixel electrodes 6 between the left-hand side and the right-hand side of the source line 2.

In this embodiment, since the first insulating layer 8 which acts as a dielectric layer of the first auxiliary capacitor 15 or the second auxiliary capacitor 14 has a significantly smaller thickness and a larger relative dielectric constant in comparison with the second insulating layer 9, the first auxiliary capacitor 15 or the second auxiliary capacitor 14 can be formed with a substantially small area with respect to the overlapping portions between the transparent pixel electrodes 6 and the source line 2 without sacrificing the pixel aperture region. Accordingly, by adjusting the source line width to a width merely required for blocking disclination while preventing crosstalk from occurring, the source line width can be set much narrower in comparison with the conventional example, and the aperture ratio can be greatly improved.

Figure 5:
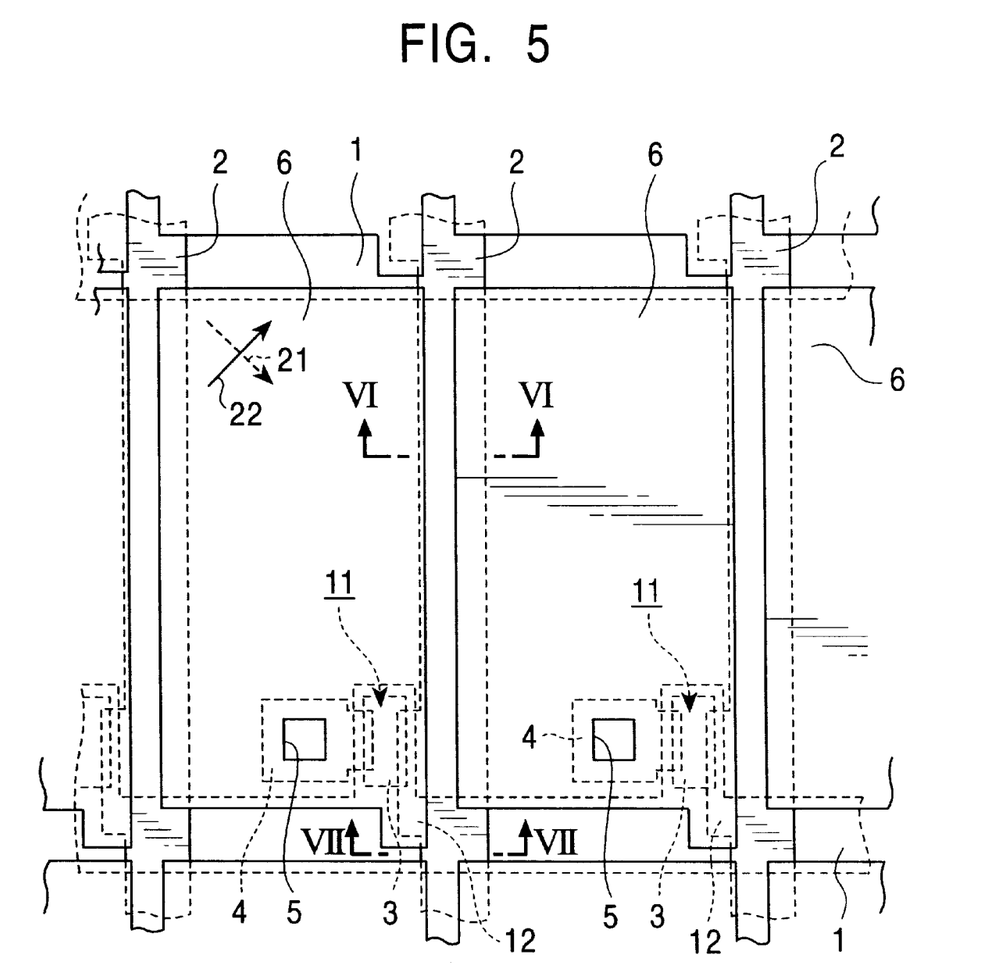
FIG. 5 is a plan view of a liquid crystal display device according to a second embodiment of the present invention.
Figure 6:
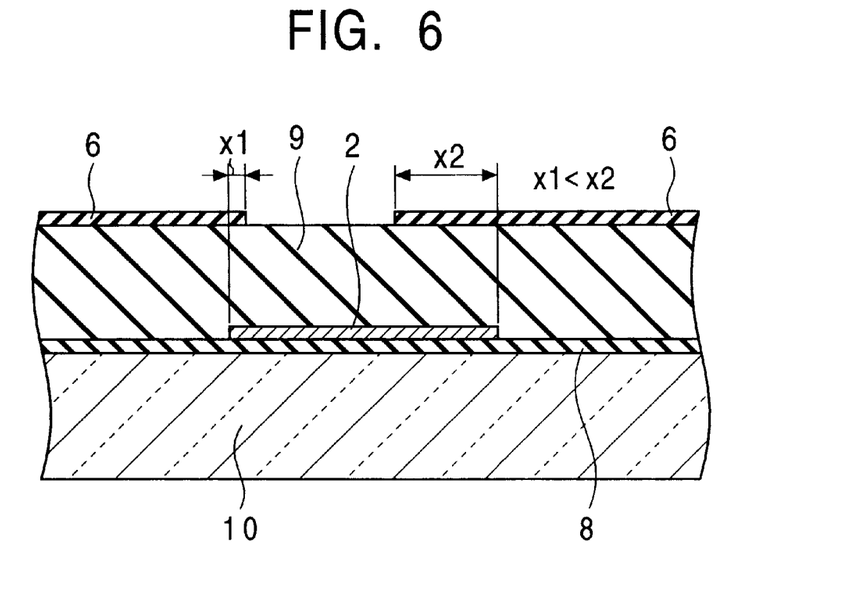
FIG. 6 is a sectional view taken along the line VI—VI of FIG. 5.
Figure 7:
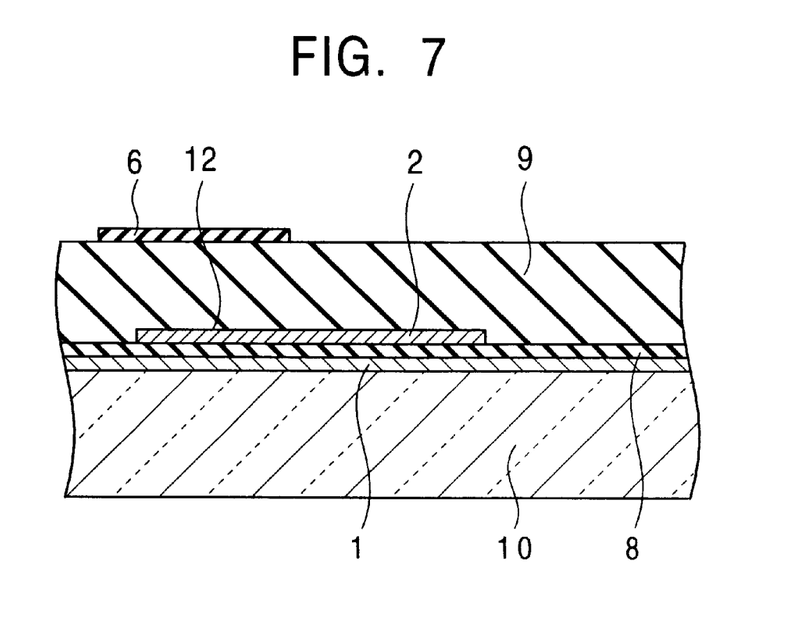
FIG. 7 is a sectional view taken along the line VII—VII of FIG. 5.

FIG. 5 is a plan view of a liquid crystal display device according to a second embodiment of the present invention, FIG. 6 is a sectional view taken along the line VI—VI of FIG. 5, and FIG. 7 is a sectional view taken along the line VII—VII of FIG. 5. The method for fabricating a TFT substrate and materials to be used are the same as those in the first embodiment. Transparent pixel electrodes 6 are formed so that a source line 2 overlaps its adjacent transparent pixel electrodes 6 on both sides with different overlapping widths in a manner similar to that in the first embodiment. The same numerals are used for the members similar to those in the first embodiment and a description thereof will be omitted.

In the second embodiment, an auxiliary capacitor 12 is formed by specially arranging an overlapping portion between the transparent pixel electrode 6 and the source line 2. In other words, in the structure of a conventional thin-film transistor, a source electrode is usually provided only in a section on a semiconductor layer, while in the structure of this embodiment, a source electrode is extended from a section on a semiconductor layer 3 to a section on a gate line 1 to form an auxiliary electrode, and the auxiliary electrode and the transparent pixel electrode 6 which is opposed to the auxiliary electrode with a second insulating layer 9 therebetween constitute the auxiliary capacitor 12. Furthermore, in order to effectively arrange the auxiliary capacitor 12, a thin-film transistor 11 is disposed on the side in which the overlapping width of the source line 2 with its adjacent transparent pixel electrode 6 is smaller between both sides of the source line 2. Thus, the upper section of the source electrode of the thin-film transistor 11 can also be used as an auxiliary capacitor continuously from the auxiliary capacitor 12.

In this embodiment, the auxiliary electrode used in the first embodiment is not required, and the layout is not complex, and thus the possibility of decreasing the yield is reduced. In this embodiment, the aperture ratio can also be greatly improved in comparison with the conventional example.

As described above, in accordance with the present invention, since the individual transparent pixel electrodes adjacent to both sides of a source line are formed with different overlapping widths with the source line, and an auxiliary capacitor is formed to cancel the difference in the amount of parasitic capacitance due to the overlaps of the individual transparent pixel electrodes with the source line, the aperture ratio can be increased while preventing crosstalk from occurring in the liquid crystal display device.

What is claimed is:

1. A liquid crystal display device comprising:

a pair of substrates;

a liquid crystal enclosed between alignment layers provided on individual inner surfaces of the pair of substrates;

a plurality of gate lines and a plurality of source lines intersecting each other arrayed in a matrix with a first insulating layer therebetween on the opposing surface of one of the substrates;

switching elements, each connected to a gate electrode extending from one of the gate lines and to a source electrode extending from one of the source lines in a vicinity of each of the intersections between the gate lines and the source lines; and a transparent pixel electrode to drive the liquid crystal connected to each of the switching elements through a drain electrode, wherein a second insulating layer is disposed between the source lines and the transparent pixel electrodes, the transparent pixel electrodes adjacent to both sides of one of the source lines are formed to overlap the source line with different overlapping widths, and an auxiliary capacitor is formed to cancel a difference in an amount of parasitic capacitance generated due to the overlap of the individual transparent pixel electrodes with the source line, and wherein the auxiliary capacitor comprises an auxiliary electrode extending from the source line above the gate line as one electrode and the transparent pixel electrode extended thereon with the second insulating layer therebetween as the other electrode.

2. A liquid crystal display device according to claim 1, wherein the switching element is a thin film transistor disposed on a side of the source line in which an overlapping width of the source line with one of the adjacent transparent pixel electrodes is smaller than a side of the source line in which an overlapping width of the source line with the other of the adjacent transparent pixel electrodes.

3. A liquid crystal display device according to claim 1, wherein the auxiliary electrode is formed by the source electrode extended from a section on a semiconductor layer to a section on the gate line.

4. A liquid crystal display device comprising:

a pair of substrates;

a liquid crystal enclosed between alignment layers provided on individual inner surfaces of the pair of substrates;

a plurality of gate lines and a plurality of source lines intersecting each other arrayed in a matrix with a first insulating layer therebetween on the opposing surface of one of the substrates;

switching elements, each connected to a gate electrode extending from one of the gate lines and to a source electrode extending from one of the source lines in a vicinity of each of the intersections between the gate lines and the source lines; and a transparent pixel electrode to drive the liquid crystal connected to each of the switching elements through a drain electrode, wherein a second insulating layer is disposed between the source lines and the transparent pixel electrodes, the transparent pixel electrodes adjacent to both sides of one of the source lines are formed to overlap the source line with different overlapping widths and a ratio of the overlapping widths is dependent on rubbing directions of the alignment layers, and an auxiliary capacitor is formed to cancel a difference in an amount of parasitic capacitance generated due to the overlap of the individual transparent pixel electrodes with the source line, the auxiliary capacitor comprises the source line as one electrode and an auxiliary electrode as the other electrode, the auxiliary electrode being disposed below the source line with the first insulating layer therebetween and being one of electrically connected to and capacitively coupled to one of the transparent pixel electrode and the drain electrode, and the auxiliary electrode is, in an area of the auxiliary electrode extending in parallel with the source lines and from an area of the auxiliary electrode extending in parallel with the gate lines to an end of the auxiliary electrode, completely overlapped by the source line.

5. A liquid crystal display device according to claim 4, wherein the source line has different non-zero overlapping widths with the adjacent transparent pixel electrodes along any cross-section of the auxiliary electrode extending in parallel with the source lines and from an area of the auxiliary electrode extending in parallel with the gate lines to an end of the auxiliary electrode.

6. A liquid crystal display device according to claim 4, wherein the auxiliary electrode overlapping one of the adjacent transparent pixel electrodes extends in parallel to the source lines from an area of the auxiliary electrode extending parallel with the gate line connected to the one of the adjacent transparent pixel electrodes and terminates before overlapping with a gate line neighboring the gate line connected to the one of the adjacent transparent pixel electrodes.

7. A liquid crystal display device according to claim 4, wherein only one side of the auxiliary electrode, in an area of the auxiliary electrode extending in parallel with the source lines and from an area of the auxiliary electrode extending in parallel with the gate lines to an end of the auxiliary electrode, overlaps with the transparent pixel electrode.

8. A liquid crystal display device according to claim 4, wherein a maximum transmittance of the liquid crystal occurs in an area between the adjacent transparent pixel electrodes.

9. A liquid crystal display device according to claim 8, wherein the maximum transmittance of the liquid crystal occurs in an area substantially centered between the adjacent transparent pixel electrodes.

10. A liquid crystal display device according to claim 8, wherein a secondary peak in transmittance of the liquid crystal occurs in an area above one of the adjacent transparent pixel electrodes, whereby the overlapping width of the one of the adjacent transparent pixel electrodes and the source line is larger than the overlapping width of the other of the adjacent transparent pixel electrodes and the source line.

11. A liquid crystal display device according to claim 4, wherein the auxiliary electrode is disposed below the drain electrode with the first insulating layer therebetween.

12. A liquid crystal display device according to claim 11, wherein the auxiliary electrode is disposed below a contact hole where the transparent pixel electrode connects to the drain electrode.

13. A liquid crystal display device according to claim 4, wherein the auxiliary capacitor comprises two auxiliary capacitors connected in series between the transparent pixel electrode and the source line.

14. A liquid crystal display device comprising:

a pair of substrates;

a liquid crystal enclosed between alignment layers provided on individual inner surfaces of the pair of substrates;

a plurality of gate lines and a plurality of source lines intersecting each other arrayed in a matrix with a first insulating layer therebetween on the opposing surface of one of the substrates;

switching elements, each connected to a gate electrode extending from one of the gate lines and to a source electrode extending from one of the source lines in a vicinity of each of the intersections between the gate lines and the source lines; and a transparent pixel electrode to drive the liquid crystal connected to each of the switching elements through a drain electrode, wherein a second insulating layer is disposed between the source lines and the transparent pixel electrodes, the transparent pixel electrodes adjacent to both sides of one of the source lines are formed to overlap the source line with different overlapping widths, and an auxiliary capacitor is formed to cancel a difference in an amount of parasitic capacitance generated due to the overlap of the individual transparent pixel electrodes with the source line, wherein the auxiliary capacitor comprises the source line as one electrode and an auxiliary electrode as the other electrode, the auxiliary electrode being disposed below the source line with the first insulating layer therebetween and being one of electrically connected to and capacitively coupled to one of the transparent pixel electrode and the drain electrode, and wherein the auxiliary electrode is, in an area of the auxiliary electrode extending in parallel with the source lines and from an area of the auxiliary electrode extending in parallel with the gate lines to an end of the auxiliary electrode, completely overlapped by the source line.

15. A liquid crystal display device according to claim 14, wherein the source line has different non-zero overlapping widths with the adjacent transparent pixel electrodes along any cross-section of the auxiliary electrode extending in parallel with the source lines and from an area of the auxiliary electrode extending in parallel with the gate lines to an end of the auxiliary electrode.

16. A liquid crystal display device according to claim 14, wherein the auxiliary electrode overlapping one of the adjacent transparent pixel electrodes extends in parallel to the source lines from an area of the auxiliary electrode extending parallel with the gate line connected to the one of the adjacent transparent pixel electrodes and terminates before overlapping with a gate line neighboring the gate line connected to the one of the adjacent transparent pixel electrodes.

17. A liquid crystal display device according to claim 14, wherein only one side of the auxiliary electrode, in an area of the auxiliary electrode extending in parallel with the source lines and from an area of the auxiliary electrode extending in parallel with the gate lines to an end of the auxiliary electrode, overlaps with the transparent pixel electrode.

18. A liquid crystal display device according to claim 14, wherein a maximum transmittance of the liquid crystal occurs in an area between the adjacent transparent pixel electrodes.

19. A liquid crystal display device according to claim 18, wherein the maximum transmittance of the liquid crystal occurs in an area substantially centered between the adjacent transparent pixel electrodes.

20. A liquid crystal display device according to claim 18, wherein a secondary peak in transmittance of the liquid crystal occurs in an area above one of the adjacent transparent pixel electrodes, whereby the overlapping width of the one of the adjacent transparent pixel electrodes and the source line is larger than the overlapping width of the other of the adjacent transparent pixel electrodes and the source line.

21. A liquid crystal display device according to claim 14, wherein the auxiliary electrode is disposed below the drain electrode with the first insulating layer therebetween.

22. A liquid crystal display device according to claim 21, wherein the auxiliary electrode is disposed below a contact hole where the transparent pixel electrode connects to the drain electrode.

23. A liquid crystal display device according to claim 14, wherein the auxiliary capacitor comprises two auxiliary capacitors connected in series between the transparent pixel electrode and the source line.

* * * * *